Dec. 23, 1969     C. WULFF ET AL     3,485,856
PROCESS FOR THE PRODUCTION OF LIGHT COLORED SURFACE
ACTIVE ESTERS OF SULFO-FATTY ACIDS
AND SALTS THEREOF
Filed March 6, 1964
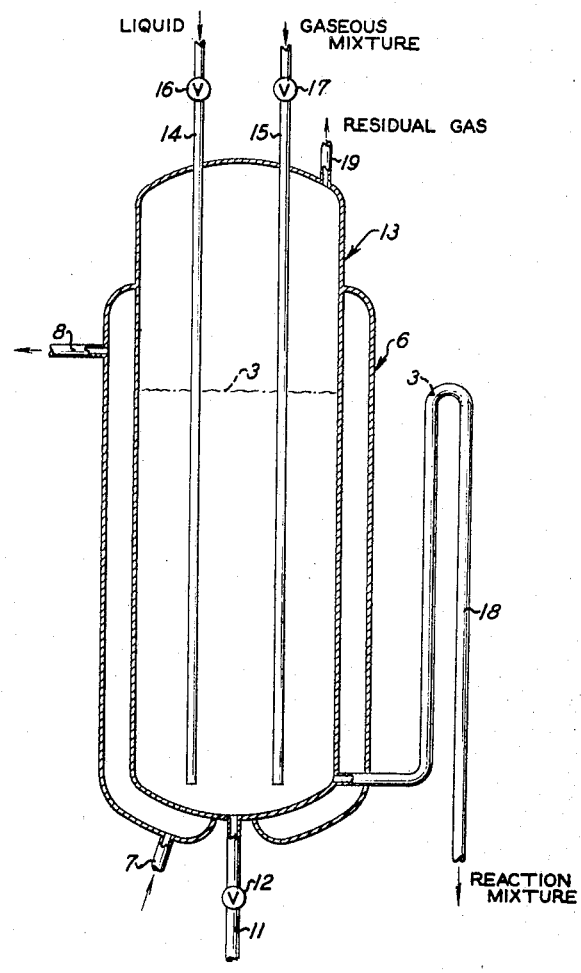
INVENTORS
CARL   WULFF
WERNER   STEIN
OTTO   KOCH
HERBERT   WEISS
BY
ATTORNEYS

United States Patent Office 3,485,856
Patented Dec. 23, 1969

3,485,856
PROCESS FOR THE PRODUCTION OF LIGHT COLORED SURFACE ACTIVE ESTERS OF SULFO-FATTY ACIDS AND SALTS THEREOF
Carl Wulff, Dusseldorf-Benrath, Werner Stein, Erkrath-Unterbach, Otto Koch, Hilden-Rhineland, and Herbert Weiss, Cologne-Deutz, Germany, assignors to Henkel & Cie., G.m.b.H., Dusseldorf-Holthausen, Germany, a corporation of Germany
Filed Mar. 6, 1964, Ser. No. 350,069
The portion of the term of the patent subsequent to Nov. 30, 1981, has been disclaimed
Claims priority, application Germany, Mar. 16, 1963, H 48,546
Int. Cl. C07c *143/90*
U.S. Cl. 260—400                                    13 Claims

ABSTRACT OF THE DISCLOSURE

Production of light colored surface active sulfo-fatty acid esters by α-sulfonating fatty-acid esters having a $C_{6-28}$ saturated fatty-acid radical substantially free from alcoholic hydroxyl groups, with a stoichiometric excess of gaseous sulfur trioxide, in the absence of solvents, e.g. at a maximum of about 100° C. and for at least a part of the sulfonation at between about 70–100° C. until a sulfonation degree of at least 90% is attained, followed by bleaching the crude sulfonation product with an aqueous hydrogen peroxide contributing component, at a temperature up to a maximum of about 100° C., the aqueous component providing sufficient water to maintain with the excess sulfur trioxide present a theoretical mixture of $SO_3$ and $H_2O$ whose $SO_3$ content is between 90% by weight and that of an aqueous sulfuric acid of 20% by weight $H_2SO_4$.

---

This is a continuation-in-part application of copending U.S. application Ser. No. 194,998, filed May 15, 1962, now U.S. Patent 3,159,657.

The present invention relates to a process for the production of light colored surface active esters of sulfo fatty acids and salts thereof, and more particularly to an improvement in the process for the production of light colored surface active sulfo fatty acid esters in which α-sulfonation of fatty acid esters having a substantially saturated fatty acid radical is carried out to a sulfonation degree of at least 90%, such that the crude sulfonation product may be conveniently bleached with an aqueous hydrogen peroxide contributing component to provide at the start of the bleaching a theoretical mixture of $SO_3$ and $H_2O$ whose $SO_3$-content is between 90% by weight and that of an aqueous sulfuric acid of 20% by weight $H_2SO_4$.

Esters of sulfo fatty acids of high molecular weight have been described in the literature as surface active substances, although hitherto they have not found any practical application, because no industrially usable process has been available for the manufacture of light colored products with a high degree of sulfonation. The sulfonation of saturated fatty acid esters, in which sulfonic acids form in the α-position, results in a great discoloration of the reaction product, in contrast to the sulfonation of unsaturated fatty acid esters in which sulfuric acid semiesters form with the addition of the sulfonating agent to the double bond.

Thus, for example, in the sulfonation of saturated fatty acid esters with chlorosulfonic acid in boiling carbon tetrachloride according to the teaching of U.S. Patent 2,460,968, dark colored products are always obtained. This is probably the reason why a bleaching of the products from such a process with oxidants such as hydrogen peroxide, per-salts and hypochlorites has been proposed, although the bleaching probably cannot be performed on a practical basis, because further information on the conditions to be observed in the bleaching is not given in the description or in the examples in said patent. If it is desired to produce by the aforementioned prior art process highly sulfonated products having a minimum degree of sulfonation of 90%, preferably 94%, and especially 96%, it is necessary to allow chlorosulfonic acid to work upon the starting material for such long periods that large quantities of contaminants are also formed, which require correspondingly large amounts of hydrogen peroxide for bleaching. The result of this is that extensive cleavage of the sulfo fatty acid esters at the ester bond by the water brought in with the hydrogen peroxide or formed from the latter during the bleaching cannot be avoided. Therefore, the above noted prior art process is not suitable for the industrial production of light colored sulfo fatty acid esters with a high degree of sulfonation.

It is an object of the present invention to overcome the foregoing drawbacks and to provide a process for the production of light colored surface active esters of sulfo fatty acids and salts thereof by α-sulfonation of fatty acid esters to a sulfonation degree of at least 90%.

It is another object of the present invention to provide α-sufonation to at least such a degree using fatty acid esters having a substantially saturated fatty acid radical with 6–8 carbon atoms and being substantially free from alcoholic hydroxyl groups.

It is another object of the present invention to provide a process of the foregoing type in which the α-sulfonation is carried out by contact with a stoichiometric excess of gaseous sulfur trioxide.

It is still another object of the present invention to provide an α-sulfonation of the foregoing type in which the gaseous sulfur trioxide is admixed with an inert gas and in which the sulfonation is carried out in the absence of solvents.

It is still another object of the present invention to provide a process of the foregoing type utilizing temperatures up to a maximum of about 100° C. and for at least a part of the sulfonation at a temperature between about 70–100° C.

It is still another object of the present invention to provide a process of the foregoing type in which the α-sulfonated product having a sulfonation degree of at least about 90% is bleached by contact with an aqueous hydrogen peroxide contributing component.

It is still another object of the present invention to provide such a process in which the bleaching is carried out at a temperature up to a maximum of about 100° C.

It is a still further object of the present invention to provide such a combined α-sulfonation and bleaching process in which sufficient water is present in the reaction mixture at the start of the bleaching to maintain with the excess sulfur trioxide present a theoretical mixture of $SO_3$ and $H_2O$ whose $SO_3$-content is between 90% by weight and that of an aqueous sulfuric acid of 20% by weight $H_2SO_4$.

It is still another object of the present invention to provide a combined process of the foregoing type to produce by means of the excess sulfur trioxide a strong sulfonating effect without an accompanying strong decomposing action even in the absence of a diluting solvent.

It is still another object of the present invention to provide a process of the foregoing type in which it is possible to produce light colored sulfo fatty acid esters with a high degree of sulfonation by a simple, versatile, industrially practicable process, while using substantially shorter reaction times than heretofore and with specific quantities of water during the bleaching to attain substantially complete color lightening of the reaction product without detrimental effects.

It is a still further object of the present invention to provide such a process in which the bleaching may be interrupted prior to its completion, and the reaction mixture substantially neutralized before the further bleaching action is resumed.

It is another object of the present invention to provide for the production of light colored surface active sulfo fatty acid esters in which the crude sulfonation product from the α-sulfonation step is subjected to the bleaching step without any need for intermediate purification of the crude sulfonation product and while such product still contains an excess of sulfur trioxide.

Other and further objects of the present invention will become apparent from a study of the within specification and accompanying examples, as well as the drawing in which a reaction vessel is shown for carrying out the α-sulfonation.

It has been found in accordance with the present invention that an improvement in the process for the production of light colored surface active sulfo fatty acid esters may be provided which comprises α-sulfonating fatty acid esters having a substantially saturated fatty acid radical with 6 to 28 carbon atoms and being substantially free from alcoholic hydroxyl groups, by contact with a stoichiometric excess of gaseous sulfur trioxide, in the absence of solvents, at a temperature maintained up to a maximum of about 100° C. and for at least a part of the sulfonation at between about 70–100° C., until a sulfonation degree of at least 90% is attained, and bleaching the crude sulfonation product thereby obtained by contact with an aqueous hydrogen peroxide contributing component, i.e. aqueous bleaching components, at a temperature up to a maximum of about 100° C., such aqueous component providing sufficient water to the reaction mixture to maintain with the excess sulfur trioxide present a theoretical mixture of $SO_3$ and $H_2O$ whose $SO_3$-content is between 90% by weight and that of an aqueous sulfuric acid of 20% by weight $H_2SO_4$ at the start of the bleaching.

Generally, the sulfur trioxide is diluted with an inert gas and the sulfur trioxide excess used amounts to about 0.05–1 mol per fatty acid radical, the sulfonation being carried out for a period of from about 20 minutes to 2 hours at a temperature of between about 20–100° C., and the bleaching being carried out for a period of from about 1 minute to 75 hours at a temperature of between about 20–100° C. The bleaching may be interrupted prior to completion of the color lightening of the crude sulfonation product so that the reaction mixture may be extensively neutralized, and the bleaching then continued until the color of the reaction mixture has been substantially further lightened. Such neutralization is preferably carried out to the extent that at least 75% of the sulfonic acids present are neutralized and also, preferably, to the extent that the reaction mixture is rendered alkaline. The post-neutralization bleaching may then be carried out for a period of at least about 10 minutes to one hour.

Significantly, the aqueous hydrogen peroxide contributing component is used in an amount sufficient to provide an equivalent quantity of bleaching oxygen to that of between about 0.2–6% by weight hydrogen peroxide, calculated as 100% by weight $H_2O_2$ with reference to the crude sulfonation product. Where a mixture of water with hydrogen peroxide in a concentration of 1–100% by weight $H_2O_2$ is used as aqueous component, the bleaching is carried out at a temperature of between about 20–80° C., and the same is true where a mixture of water with a member selected from the group consisting of cationic salts of hydrogen peroxide, hydroperoxides of hydrogen peroxide, and addition products of hydrogen peroxide, is used. Where a mixture of water with a member selected from the group consisting of hypochlorous acid, hypochlorous acid anhydrides and hypochlorous acid salts, is used as aqueous component, the bleaching is carried out at a temperature of between about 10–50° C., whereas with a mixture of water and a member selected from the group consisting of chlorous acid, chlorous acid anhydrides, and chlorous acid salts, is used as aqueous component, the bleaching is carried out at a temperature of between about 40–100° C.

Thus, in accordance with the present invention, sulfo fatty acid esters can now be produced which satisfy practical requirements both as regards the degree of sulfonation and as regards desirably light color, so long as the α-sulfonation of substantially saturated sulfo fatty acid esters with excess sulfur trioxide, preferably in an inert gas stream, is carried out to a sulfonation degree of at least 90% followed by bleaching in the presence of only so much water added along with the particular bleach utilized that a theoretical mixture of $SO_3$ and $H_2O$ forms from the excess sulfonating agent present and the water, whose $SO_3$-content is between 90% by weight and that of an aqueous sulfuric acid of 20% by weight $H_2SO_4$ at the start of the bleaching.

The discovery of the present invention is surprising mostly because sulfur trioxide not only has a normally strong sulfonating effect, but also a strong decomposing action. This strong decomposing action is not as vividly apparent in the sulfonation of alkylbenzenes and unsaturated fatty acid derivatives and/or fatty acid derivatives containing hydroxyl groups because the sulfur trioxide is preferentially bound by the easily sulfonatable groups present therein. According to the present invention, however, the much more slowly reacting, practically saturated fatty acid esters are to be sulfonated, and these do not contain any such groups which react preferentially with sulfur trioxide. Consequently, the sulfur trioxide has much more time in which to exercise a decomposing effect on the starting material, especially since the sulfur trioxide, in contrast to the chlorosulfonic acid used in the abovementioned prior-art process, is not diluted with an organic solvent yet surprisingly the expected decomposition does not occur. Furthermore, the teaching of the invention to perform the bleaching in the presence of certain amounts of water depending on the amounts of excess free sulfonating agents, whereby to utilize such free sulfonating agent effectively during the bleaching, cannot be derived from the state of the art. The technical advance achieved by the present invention is not only to be seen in the fact that it has become possible to produce light colored sulfo fatty acid esters with a high degree of sulfonation by an industrially usable process in the absence of solvents, but also in the fact that this high degree of sulfonation is achieved in substantially shorter reaction times than in the method of the prior art.

The $a$-sulfo fatty acid esters to be produced according to the invention are derived from saturated fatty acids having 6 to 28, and preferably 8 to 18 carbon atoms, especially from those saturated fatty acids which are obtained from natural fats of plants and land or water animals, but which may also be of synthetic origin. These include fatty acids of a natural origin, and in particular those obtained from the natural fats of plants, land animals, or water animals, are those most commonly used. Actually, fatty acids, such as caproic, enanthylic, caprylic, pelargonic, capric, undecylic, lauric, tridecoic, myristic, pentadecanoic, palmitic, margaric, stearic, nondecylic, arachidic, heneicosanic, behenic, tricosanic, carnaubic, hyenic, carboceric, cerotic, and octocosanic acids are partiularly contemplated as the starting materials for the instant esters and especially those in the ordinal sequence enumerated from caprylic to stearic acids.

It is possible by the selection of the starting fats to influence substantially the properties of the sulfonates to be produced. Thus, from fats which contain mainly fatty acids having 10 to 14 carbon atoms per fatty acid radical, particularly from the fats of the lauric acid group which are especially rich in lauric acid, products can be obtained which are easily soluble even at low temperatures of, for example, 20 to 45° C., while from other fats, which contain mainly fatty acids with 16 to 18 carbon atoms in the molecule, such as vegetable fats other than the above, and from tallow or from whale and fish oils, products can be obtained which are not as easily soluble in the cold state, but which are well usable at temperatures ranging from 50 to 100° C. Esters derived from these fatty acids, in which no sulfonatable groups are to be present aside from the hydrogen atom in the α-position, i.e. such as double bonds or alcoholic hydroxyl groups, are sulfonated in the manner described hereinafter.

These starting esters may be derived from monovalent or polyvalent alcohols, especially from monovalent to trivalent alcohols. Insofar as the fatty acid esters are derived from monovalent primary aliphatic alcohols, these alcohols may contain from about 1 to 5 carbons in the molecule. Accordingly, for example, the esters of fatty acids with methyl, ethyl, n-propyl, i-propyl, n-, i-, sec.-, tert.-butyl and pentyl alcohols are usable. Of especial practical importance are the esters of alcohols containing 1 to 4 carbon atoms in the molecule.

Polyvalent alcohols from which the starting fatty acid esters to be sulfonated can be derived include, for example, ethylene glycol, propylene glycol, butylene glycols and di- and polyglycols derived from the latter, and glycerin, pentanetriols, etc. It will be appreciated that not all of the hydroxyl groups need to be esterified with higher fatty acids, i.e., fatty acids containing at least 6 and preferably at least 8 carbon atoms as aforesaid. In addition to the radicals of higher fatty acids, mentioned above, radicals of lower fatty acids, such as those with 2 to 5 carbon atoms, may also be present, with an ester-like bond linking the same to other hydroxyl groups of the polyvalent alcohol. Examples of this type starting alcohol for forming the instant esters with higher fatty acids are the so-called monoacetin and diacetin fats.

Many fatty acid esters, especially those of natural origin, and the products made from them, often contain accompanying substances that produce decomposition products which are strongly discolored. Though it is also possible according to the invention to bleach even these decomposition products, it is nevertheless preferable when feasible not to burden the bleaching process with the decomposition products of those accompanying substances which can be removed without difficulty from the natural fats or from the fatty acid esters made by way of the free fatty acids, prior to the actual α-sulfonation process of the invention. Products which form strongly colored contaminants with the sulfonating agents include, for example, unsaturated fatty acids and their esters. Therefore, the fatty acid esters to be processed are to be as extensively saturated as possible, i.e., their iodine numbers should be less than 2, preferably less than 1, and especially less than 0.8.

As starting material for the α-sulfonation, it is advantageous to use fatty acid esters which do not contain any accompanying substances that are easily decomposable by sulfur trioxide. The removal of these accompanying substances can be accomplished without difficulty by distilling the esters or their intermediates such as the fatty acids or the esters which are still to be hydrogenated and which contain unsaturated components. If the distillation of the esters can be accomplished only at special technical expense, as for example on account of their high boiling point, it is preferable to produce the esters from distillate fatty acids or to remove in some other manner the impurities present in the starting material which is to be sulfonated. This is true particularly of the natural fats, especially the natural triglycerides, from which proteins and mucins are separated by methods conventionally used in the deacidification and refinement of oils.

To transform them into the corresponding sulfonic acids, these fatty acid esters are combined with gaseous sulfur trioxide diluted with inert gas, operating practically in the absence of any inert solvents. Among the inert gas diluents usable are air, nitrogen, carbon dioxide, etc., the gas mixture containing 2–40 and preferably 3–20 volume percent of sulfur trioxide. The sulfonation can be performed in many different kinds of apparatus: for example, the gas containing sulfur trioxide can be bubbled through the ester with the latter in the liquid state, or the gas can be combined with the liquid ester in nozzles, thus transforming the latter into fine droplets, or the fatty acid esters can be brought into contact with the gas current containing sulfur trioxide by flowing the esters in the form of a thin film.

The sulfur trioxide is generally used in an excess amounting to 0.05 to 1 mol per mol of the fatty acid radical to be sulfonated. Preferably, a sulfur trioxide excess of 0.1 to 0.7 is used, and especially from 0.1 to 0.4 mol of $SO_3$ per mol of the fatty acid radical to be sulfonated.

In order to achieve a minimum degree of sulfonation of 90%, or preferably of 94%, and especially of more than 96%, in reaction times ranging preferably from 20 to 60 minutes, it is preferable to let the sulfonation take place at least for a time, preferably at or toward the end of the sulfonation, at temperatures above 70°, although nevertheless avoiding temperatures above 100° C. and possible thermal decompositions at such excess temperatures. It is best to work at 75 to 90° C. The feeding in of the sulfur trioxide can be extended over the entire reaction time; but it is also possible to introduce the sulfur trioxide required for the reaction within shorter periods and then let the reaction mixture continue to react for an additional period of time. The entire reaction time ought not, in general, to exceed two hours. The introduction of the sulfur trioxide can be terminated within substantially briefer periods of, for example, at least 5 minutes, especially when apparatus is available which favors a transfer of the sulfur trioxide from the gas to the liquid.

The sulfonation is performed almost exclusively at the α-atom of the fatty acid radical.

Advantageously, the bleaching of the invention can be performed immediately following the sulfonation without any further purification of the crude sulfonation product, which still contains excess sulfur trioxide.

Hydrogen peroxide or compounds which form hydrogen peroxide in situ under the conditions of the bleaching operation may serve as bleaches. These compounds include the salts of hydrogen peroxide, the hydroperoxides thereof and the addition products thereof formed with organic substances. The salts of hydrogen peroxide include those compounds in which at least one hydrogen atom of of the hydrogen peroxide is substituted by a cation, preferably by an inorganic cation. Examples are the peroxides of the alkalies and alkaline earths, especially the peroxides of sodium, potassium, magnesium, calcium, strontium, and barium. The hydroperoxides can be derived from the borates, carbonates, orthophosphates, pyro- and polyphosphates, especially the tripolyphosphates, i.e. perborates, percarbonates, perphosphates, etc., the said compounds containing preferably sodium or potassium as the cation. Compounds formed by the addition of hydrogen peroxide to organic substances are derived, for example from urea of from hexamethylene tetramine as organic substances.

Instead of these bleaches, chlorites or hypochlorites of metals such as sodium, potassium, magnesium, calcium, etc. can be used, as well as the free acids or acid anhydrides corresponding thereto. Chlorous acid, like hypochlorous acid, is not stable in the free state, especially in the presence of sulfuric acid. Both decompose, the resulting decomposition products, chlorine dioxide or chlorine, being considered in the sense of the present invention as anhydrides of these acids. The bleaching can also be performed by the introduction of these acid anhydrides into the α-sulfonation product, in which a $SO_3$—$H_2O$ mixture of the above-stated concentration has been formed by the addition of water.

The invention will first be described with reference to the use of hydrogen peroxide as the bleach. The hydrogen peroxide can be used in all standard commercial concentrations, as for example in concentration from 1 to 100 weight percent; it is preferable to work with concentrations of 20 to 75 and especially from 30 to 60 weight percent $H_2O_2$. It has become apparent that the bleaching effect is dependent not only on the bleach itself, the quantity thereof and the temperatures to be used in the bleaching operation, but also very substantially upon the quantity of the excess sulfonating agent present in the α-sulfonation product. In the interest of good success in the bleaching, care must be taken to see that the excess sulfonating agent is no longer present in the form of sulfur trioxide, but as a mixture of $SO_3$ and $H_2O$ whose $SO_3$-content is between 90% by weight and that of an aqueous sulfuric acid of 20% by weight $H_2SO_4$, that is at least about 16.3% by weight $SO_3$ with the remainder being $H_2O$.

Since sulfonating agents, especially sulfur trioxide, as well as hydrogen peroxide and water are mixed with the sulfonic acid to be bleached, the above-stated concentrations have nothing but a mathematical significance. They are computed from the amount of excess sulfonating agent and the amount of water which is present in the beginning of the bleaching reaction including any water which is introduced into the mixture to be bleached in any way, e.g. together with the hydrogen peroxide or with any other aqueous solution of another bleaching agent, without regard to the amount of sulfonic acid and other by-products. The amounts of water formed from the hydrogen peroxide during the bleaching operation are not taken into consideration as these are insignificant for the purposes in question. Operating within the concentrations stated has the advantage in the case of fatty acid esters that cleavage of the ester bond is suppressed.

The amount of hydrogen peroxide to be used can vary within wide limits. With the addition of only small amounts of, for example, 0.2 weight percent, calculated as 100% $H_2O_2$, based on the non-refined crude sulfonation product, a plainly evident lightening of color can be found. Colorimetrically speaking, this lightening of color becomes perceptible first in the blue component, and then extends to the red and yellow components as the amounts of $H_2O_2$ increase, as is the case, for instance, with $H_2O_2$ amounts of 0.5 or 1.5 weight percent. The amounts of hydrogen peroxide here mentioned are to be considered only as data given by way of example; they are governed, of course, by the quantity of the colored contaminants, which usually increases with the chain length of the fatty acids. Larger amounts of hydrogen peroxide are necessary in the case of sulfo fatty acid esters from longer-chain fatty acids than in the case of those from shorter-chain fatty acids. In general, with 0.2 weight percent of hydrogen peroxide, a perceptible lightening will be achieved, which can, however, be improved by increasing the amount of bleach to 3 weight percent, for example. In special cases, as much as 6 weight percent of bleach may be used. It is preferable to operate with 1 to 3 weight percent, computed as 100% $H_2O_2$ with reference to the crude sulfonation products.

For the performance of the process of the invention, the hydrogen peroxide is added to the sulfonic acid in the necessary quantity as determined, if necessary by preliminary tests. The sulfonic acid often becomes warm, rising, for example, to temperatures of 60° C. due to the bleaching reaction. If no self-warming occurs, it is recommended to heat the product to be bleached.

Care must be taken to see, however, that the temperature of the mixture does not exceed 100° C. If possible, one should not operate in the neighborhood of this maximum temperature unless the apparatus is such that it is possible to remove the very rapidly released heat of reaction. If this is impossible, then it is best to remain at temperatures below 90° and preferably below 80° C.

The bleaching time varies with the starting material, the amount of hydrogen peroxide and the temperature, which is to amount to at least 20° C. Short reaction times of, for example, 2 to 15 minutes are generally used at high temperatures of, for example, 70 to 90° C., while at lower temperatures of, for example 40 to 70° C., reaction times of 15 minutes to 5 hours will be used. These times are to be considered only as approximations; the bleaching time may be shorter or longer and may range from about one minute to 75 hours.

The bleaching process described above for hydrogen peroxide is applied accordingly in the case of the other bleaching agents to be used in its stead. If these bleaches contain cations which neutralize a portion of the sulfonating agent, then the sulfuric acid concentration at the commencement of the bleaching operation is computed according to the free sulfuric acid still remaining after the neutralization. These bleaches are generally used in quantities which, with reference to the oxidation equivalent, are equivalent to the above-stated quantities of hydrogen peroxide. It is preferable to use those salts, hydroperoxides, or addition compounds of hydrogen peroxide that are solids, or those chlorites or hypochlorites that are solids, in the form of finely divided aqueous solutions or suspensions.

It has developed that the above-described bleaching of the acid sulfonation products can be combined with a further bleaching to be performed after extensive neutralization of the said acid sulfonation products, for example to the mono-salt form. In this regard, to neutralize the bleached acid sulfonation products, inorganic or organic bases or basic salts, such as, for example, the carbonates or bicarbonates, can be used, which are derived from ammonium, sodium, potassium, magnesium, or low organic amines, i.e. lower alkylamines, or alkylolamines with 1 to 10 and preferably 1 to 6 carbon atoms in the molecule. The neutralization should take place at least to the extent that 75%, and especially 100%, of the sulfonic acids present are neutralized. Since the substances to be bleached in most cases contain excess sulfonating agents, the latter, if they are not simultaneously neutralized, would render slightly acid the product that is to be post-bleached. If that is not desired, the excess sulfonating agent can also be neutralized, and the reaction product can even be made alkaline, say to a pH value of 10.5 and preferably up to a pH of 9 by adding the required quantity of basic acid-binding substance.

The above-mentioned bleaches can be used also for the further bleaching of neutralized sulfonation products. In this connection, if hydrochlorous acid, or its anhydrides or salts are used, in the further bleaching, it is recommended not to perform the bleaching at excessively high temperatures, but rather to perform it at temperatures of 10 to 50, and preferably 15 to 40° C. If, however, hydrogen peroxide or chlorous acid or its anhydrides or salts are used in the further bleaching, it is recommended to bleach at elevated temperatures, say from 40 to 100° C. and preferably 50 to 80° C. The post-neutralization bleaching can be effected with the addition of further quantities of bleach or by initially providing sufficient bleach material that active bleaching action will continue after the neutralization.

The neutralization of the bleached acid sulfonation products can be performed at any given time even though the bleach added at the beginning of the bleaching operation has not yet been entirely consumed, since after neutralization continued bleaching effect is possible as aforesaid. Of course, the bleaching of the acid sulfonation product must have progressed before neutralization to such an extent that the blue component has decreased in the neutralization to a color value of a maximum of 5, and preferably one of less than 1. It is also expedient for the red component to have decreased substantially, for instance, to a color value of 10, or preferably less than 5, during the bleaching in the acid region. These color values apply to a 5% (with reference to free sulfonic acid) aqueous solution of the neutralized sulfonation product, measured on the Lovibond Tintometer in a 4″ cell.

If different oxidants are used in the two bleaching stages, i.e. before and after neutralization, consideration must be taken of the fact that many oxidants consume one another by mutual oxidation or reduction. This is true, for example, of hypochlorous acid and hydrogen peroxide. Therefore, if such a pair of oxidants is to be used, care must be taken to see that the oxidant used in the first stage has been fully consumed before the oxidant of the second stage is added, or the oxidant of the second stage must be used in a correspondingly larger amount sufficient to offset any such consumption.

The amount of the oxidants to be used in the second bleaching stage, i.e. after neutralization, can be just as great as stated above with respect to the first bleaching stage, i.e. acid bleaching before neutralization. In many cases, however, better bleaching results can be obtained than in the case of a single bleaching done in an acid medium, if one portion of the oxidants is allowed to work before neutralization and another portion after neutralization, without changing the total amount of oxidants. All of the oxidant can be added at the beginning, but the oxidant can also be added in portions before and after neutralization or in the course of the same.

The post-bleaching time can vary within wide limits. The minimum bleaching time is dependent, of course, on the nature of the starting material, the bleach used, and the bleaching temperature. If hypochlorous acid, its salts, or its anhydrides are used, the minimum bleaching time at temperatures of 20 to 40° C. amounts to from 30 to 10 minutes, and at temperatures from 10 to 30° C. it amounts to approximately 60 to 30 minutes. If hydrogen peroxide is used, or substances forming hydrogen peroxide under the conditions of the reaction, the minimum bleaching time at temperatures of 50 to 80° C. will run around one hour and at still higher working temperatures, times as low as 10–30 minutes may be used, while at lower temperatures times as high as 10–12 hours may be required. Actually, the permissible length of the bleaching time is practically unlimited. The neutralized sulfonation product can even be left alone with the bleach added, and especially in the case of industrial methods of procedure, it can be stored for future processing, and in such case the bleaching will take place without any further manipulation.

The experiments described in the following examples are preformed on the following general basis, unless otherwise expressly stated in the individual examples:

An air current containing sulfur trioxide ($SO_3$ content=5% by volume) is passed through the liquid fatty acid ester at such a velocity that the desired amount of sulfur trioxide is absorbed in the course of 45 to 60 minutes. The blackish brown, viscous mass thus obtained is cooled to room temperature and mixed with 3% of its weight of $H_2O_2$ in the form of a 40% hydrogen peroxide, and then it is kept for 30 minutes at 60° C. After the bleaching is completed, the product is cooled to room temperature and neutralized with 30% caustic soda solution.

The amount of hydrogen peroxide to be used for the bleaching can, of course, also be added gradually. In this case, it is unnecessary to cool the crude sulfonation product before the hydrogen peroxide is added, and then heat it to the bleaching temperature.

Instead of caustic soda solution, any other acid-binding substances ordinarily used for acid-binding purposes can serve for neutralization herein, such as caustic potash solution, or the carbonates or bicarbonates of the alkalies, suitable alkaline earth compounds of the aforementioned type, and ammonia and organic bases, especially primary, secondary or tertiary amines having alkyl or alkylol radicals of 1 to 5 carbon atoms.

The "sulfuric acid" present in the sulfonization product, which is mentioned in the examples, is that sulfuric acid which forms from excess sulfonating agent, especially $SO_3$, and the water that is added along with the bleach. The composition of this sulfuric acid, stated in percent by weight, is always computed as of the moment before the commencement of the bleaching process, taking into account, of course, any reduction of the $H_2SO_4$ concentration due to the reaction of the same with a bleach that is present in the form of a salt.

The color values are determined on the basis of aqueous solutions of the neutralized unbleached or bleached sulfonation products, said solutions containing 5 weight percent of the neutralized sulfonation product. The "Lovibond Tintometer" is used for the measurement; the solutions to be measured are placed in cells with a 4″ depth.

To demonstrate the technical effects achieved by the present invention, the examples below also contain comparison data on experiments in which the conditions of the present invention are not adhered to, especially the composition of the sulfuric acid present in the sulfonation product.

EXAMPLE 1

The sulfo fatty acid to be bleached is made from the hydrogenated ethyl ester of coconut fatty acid (acid number 2.5; saponification number 223; iodine number 0.1) at 80° C., using 1.3 mol of sulfur trioxide to 1 mol of ester. The reaction product has a degree of sulfonation of 96%. The color values of a 5% solution of the unbleached, neutralized reaction product are: yellow 27; red 18–21; blue 10–12.

(a) Relationship between bleaching action and quantity of $H_2O_2$

| Amount of bleach as percentage of 100% $H_2O_2$ in the crude sulfonation product | Composition of the $H_2SO_4$ present in the sulfonation product | | Color values | | |
|---|---|---|---|---|---|
| | Percent $SO_3$ | Percent $H_2O$ | Yellow | Red | Blue |
| 0.5 | 93 | 7 | 18.6 | 3.4 | 0 |
| 1.0 | 86 | 14 | 7.3 | 1.0 | 0 |
| 1.5 | 80 | 20 | 2.5 | 0.7 | 0 |
| 2.0 | 75 | 25 | 2.0 | 0.4 | 0 |
| 2.5 | 71 | 29 | 1.1 | 0.2 | 0 |
| 3.0 | 69 | 31 | 0.9 | 0.0 | 0 |

(b) Relationship between bleaching action and the bleaching temperature: composition of the sulfuric acid present in the sulfonation product: 69% $SO_3$, 31% $H_2O$, bleaching time 15 minutes.

| | Color Values | | |
|---|---|---|---|
| | Yellow | Red | Blue |
| Bleaching temperature, ° C. | | | |
| 20 | 18.0 | 3.3 | 0 |
| 40 | 10.0 | 1.7 | 0 |
| 60 | 2.4 | 0.5 | 0 |
| 80 | 12.0 | 1.2 | 0 |

(c) Relationship between bleaching action and time: composition of the sulfuric acid present in the sulfonation product: 69% $SO_3$, 31% $H_2O$, bleaching temperature: 20° C.

| | Color Values | | |
|---|---|---|---|
| | Yellow | Red | Blue |
| Bleaching Time: | | | |
| 15 minutes | 15.0 | 2.7 | 0 |
| 30 minutes | 8.0 | 1.4 | 0 |
| 1 hour | 6.5 | 1.2 | 0 |
| 7 hours | 3.5 | 0.6 | 0 |
| 24 hours | 2.0 | 0.2 | 0 |
| 48 hours | 1.0 | 0.1 | 0 |

(d) Relationship between bleaching action and time: composition of the sulfuric acid present in the sulfonation product: 69% $SO_3$, 31% $H_2O$, bleaching temperature: 55° C.

| Bleaching Time: | Color Values | | |
|---|---|---|---|
| | Yellow | Red | Blue |
| 5 minutes | 8.3 | 1.3 | 0 |
| 30 minutes | 2.2 | 0.5 | 0 |
| 2 hours | 1.5 | 0.1 | 0 |

(e) Relationship between bleaching action and time: composition of the sulfuric acid present in the sulfonation product: 69% $SO_3$, 31% $H_2O$, bleaching temperature: 90° C.

| Bleaching Time: | Color Values | | |
|---|---|---|---|
| | Yellow | Red | Blue |
| 5 minutes | 4.2 | 0.9 | 0 |
| 15 minutes | 3.5 | 0.8 | 0 |
| 30 minutes | 3.2 | 0.7 | 0 |
| 1 hour | 27.0 | 3.5 | 0 |
| 2 hours | 27.0 | 5.3 | 0 |
| 3 hours | 27.0 | 6.2 | 0 |

(f) Relationship between bleaching action and the concentration of the hydrogen peroxide used. 1 wt. percent $H_2O_2$.

| | Composition of the $H_2SO_4$ present in the sulfonation product | | Color Values | | |
|---|---|---|---|---|---|
| Concentration of the $H_2O_2$ used, in percent | Percent $SO_3$ | Percent $H_2O$ | Yellow | Red | Blue |
| 60 | 93 | 7 | 27 | 5.2 | 0 |
| 40 | 86 | 14 | 25 | 4.0 | 0 |
| 30 | 81.5 | 18.5 | 12 | 2.2 | 0 |
| 20 | 69 | 31 | 13 | 2.5 | 0 |
| 10 | 51 | 49 | 9.3 | 1.7 | 0 |
| 5 | 35 | 65 | 20 | 3.3 | 0 |

(g) Relationship between bleaching action and the concentration of the hydrogen peroxide used. 2 wt. percent $H_2O_2$.

| | Composition of the $H_2SO_4$ present in the sulfonation product | | Color Values | | |
|---|---|---|---|---|---|
| Concentration of the $H_2O_2$ used, in percent | Percent $SO_3$ | Percent $H_2O$ | Yellow | Red | Blue |
| 80 | 93 | 7 | 16 | 2.3 | 0 |
| 60 | 88 | 12 | 13 | 2.2 | 0 |
| 50 | 81.5 | 18.5 | 10 | 2.1 | 0 |
| 40 | 75 | 25 | 3 | 0.4 | 0 |
| 30 | 69 | 31 | 3.5 | 0.6 | 0 |
| 20 | 51 | 49 | 5 | 1.0 | 0 |

(h) Relationship between bleaching action and the concentration of the hydrogen peroxide used. 3 wt. percent $H_2O_2$.

| | Composition of the $H_2SO_4$ present in the sulfonation product | | Color Values | | |
|---|---|---|---|---|---|
| Concentration of the $H_2O_2$ used, in percent | Percent $SO_3$ | Percent $H_2O$ | Yellow | Red | Blue |
| 80 | 93 | 7 | 7 | 1.7 | 0 |
| 60 | 81.5 | 18.5 | 2.6 | 0.6 | 0 |
| 40 | 69 | 31 | 1.0 | 0.1 | 0 |
| 20 | 47 | 53 | 3.0 | 0.4 | 0 |

EXAMPLE 2

A hydrogenated tallow fatty acid ethyl ester (acid number 2.0; sap. number 185; iod. number 0.1) is sulfonated in the manner described in Example 1, but using 1.4 mol of sulfur trioxide per mol of ester. The degree of sulfonation of the product obtained is 94.9%. The table gives the color values obtained, in relation to the amount of bleach.

| Amount of bleach as percentage of 100% $H_2O_2$ in the crude sulfonation product | Composition of the $H_2SO_4$ present in the sulfonation product | | Color values | | |
|---|---|---|---|---|---|
| | Percent $SO_3$ | Percent $H_2O$ | Yellow | Red | Blue |
| 0 | | | 27 | 24 | 11.8 |
| 1 | 85 | 15 | 27 | 6.5 | 0.3 |
| 2 | 74 | 26 | 20 | 2.8 | 0 |
| 3 | 65 | 35 | 11 | 1.6 | 0 |
| 4 | 59 | 41 | 3 | 0.2 | 0 |

EXAMPLE 3

A sulfonation product is bleached, which has been obtained from deacidified, bleached, hardened and steamed coconut oil (acid number 0.4, sap. number 253, iod. number 1) in a manner analogous to that in which the sulfonation product processed in Example 1 is obtained. The crude sulfonation product contains approximately 0.3 molecule of dissolved free sulfur trioxide per fatty acid radical, and has a degree of sulfonation of 96.2%. After the bleaching and neutralization, a sulfonate is obtained with the following color values (color values of the sulfonate made from the unbleached sulfonation product are shown between parentheses for comparison):

Yellow—1.7 (27); red—0.1 (12); blue—0.0 (6.7).

EXAMPLE 4

The sulfonation product of a caprylic acid ethyl ester (acid number 0.6; sap. No. 325; iod. No. 0), which has been obtained from the ester and sulfur trioxide like the starting materials processed in the preceding examples and which contains about 0.3 mol of sulfur trioxide in solution per mol of ester and has a degree of sulfonation of 97%, is bleached with 2 weight percent $H_2O_2$. After bleaching and neutralization, a sulfonate is obtained with the following color values (color values of the sulfonate made from the unbleached sulfonation product are given between parentheses for comparison:

Yellow—0.8 (25); red—0.2 (9.5); blue—0.2 (6.3).

EXAMPLE 5

The crude sulfonation product used here as the starting material is manufactured continuously in an apparatus that consists of five vessels each being of the type shown in the annexed drawing, made of stainless steel and all arranged in tandem. The starting material to be sulfonated 3 is represented in the reaction vessel 13, such starting material and the sulfur trioxide-air mixture being fed through lines 14 and 15, respectively, which are controlled by valves 16 and 17. The air, substantially free of sulfur trioxide, passes out at 19, and the reaction mixture passes out through line 18. The bottom portion of the reaction vessel is surrounded by the heat exchange jacket 6 with the heat exchange fluid inlet 7 and outlet 8. The capacity of each vessel at overflow amounts to 600 cc. and the outlet line 18 of the first four vessels is connected to the feed line, respectively, of the next subsequent vessel to provide the desired continuous operating series arrangement. The crude α-sulfonation product is obtained from line 18 of the fifth vessel.

The first four reaction vessels are filled with a hardened palm nut fatty acid ethyl ester (iodine number 0.1) as starting material, and the heating is so adjusted that the material in the vessels has the following temperature, increasing from vessel to vessel, during the entire experiment: 50°, 50°, 65°, 80°, and 85° C. Then sulfur trioxide, diluted with 20 times its amount with air, is blown into vessels 1 to 4 in such amounts that the ester in vessels 1 to 4 has absorbed the following individual amounts of sulfur trioxide, measured by the amount stoichiometrically necessary for a quantitative sulfonation: 52, 78, 104, and 130%. No sulfur trioxide-air mixture is flushed into vessel 5. After these amounts have been absorbed, 1.71 kg. of additional ester is pumped per hour continuously into vessel 1 and the mixture is pumped in turn through the remaining vessels. So much of the above-mentioned sulfur trioxide-air mixture is introduced into the first four reaction vessels that a total of 1.3 mols per mol of fatty acid is absorbed by the ester departing from vessel 4, and 40% of this amount of sulfur trioxide is absorbed in vessel 1, and 20% in each of vessels 2 to 4. Here again, no sulfur trioxide is blown into the fifth vessel since this last vessel is used for the post-reaction.

For the continuous bleaching of the blackish brown reaction product thus obtained, which has a degree of sulfonation of 97% and contains about 0.3 mol of sulfur trioxide per mol of fatty acid ester, this product is taken from line 18 of the fifth vessel and chilled to 20 to 22° C. in a continuous-flow cooler. 2420 grams per hour of the product leaving the cooler are mixed in a mixing machine with 181 grams per hour of 20% aqueous hydrogen peroxide. The time of stay in the mixer is 1 minute. The mixture then passes through a cooling zone in which so much of the reaction heat is carried off that the product has a temperature of 35 to 40° C. after leaving the cooling zone. The product is then led through two vessels for post-reaction, in which it is heated first to 40° C. and then to 60° C. The time of stay in the first vessel is 2 hours, and in the second vessel 1 hour. The product is then neutralized with 6% aqueous solution of caustic soda.

The experiment described is continued for 72 hours without interruption, and delivers a product which has a degree of sulfonation of 95% which remains substantially uniform over the entire duration of the experiment, and shows the following color values:

Yellow—2.0; red—0.1; blue—0.0.

EXAMPLE 6

The ethyl ester of a hydrogenated palm nut fatty acid (iodine No. 0.2) is sulfonated under the conditions described in Example 1. The sulfonation product contains about 7.8 weight percent of free sulfur trioxide and has a degree of sulfonation of 95.4%. After the addition of 3% of its weight of $NaClO_2$ (used in the form of a 40% aqueous solution; composition of the sulfuric acid prior to reaction with the bleach: 64% $SO_3$ and 36% $H_2O$; after reaction with the bleach: 59% $SO_3$ and 41% $H_2O$), the sulfonation product is bleached for 90 minutes at 40° C. The color values are:

Yellow—3.5; red—0.9; blue—0.1.

EXAMPLE 7

A mixture of 1 mol of hardened coconut oil and 3 mols of the ethyl ester of a hardened palm nut fatty acid (iodine number of the mixture: 0.2) is sulfonated under the conditions stated in Example 1. The sulfonation product, which contains about 8 weight percent of free $SO_3$ and has a degree of sulfonation of 95.8%, is bleached for 90 minutes at 40° C. after the addition of 3% of its weight in $NaClO_2$ (used as a 40% aqueous solution; composition of the sulfuric action before reaction with the bleach: 65% $SO_3$ and 35% $H_2O$; after the reaction with the bleach: 60% $SO_3$ and 40% $H_2O$). The color values are:

Yellow—18; red—2.6; blue 0.

EXAMPLE 8

The following studies on bleaching with $NaClO_2$ are performed on a sulfonation product which has been produced from the thyl ester of a hydrogenated palm nut fatty acid as outlined in Example 6. The degree of sulfonation of the product is 96.1%.

(a) Relationship between bleaching action and concentration of $NaClO_2$: bleaching temperature 60° C.; time 1½ hours.

| | Composition of the sulfuric acid in the sulfonation product: Reaction with the bleach | | | | Color Values | | |
|---|---|---|---|---|---|---|---|
| | Before | | After | | | | |
| | Percent $SO_3$ | Percent $H_2O$ | Percent $SO_3$ | Percent $H_2O$ | Yellow | Red | Blue |
| Bleach: | | | | | | | |
| 3% $NaClO_2$, solid | | | | | 5 | 1.0 | 0.3 |
| 3% $NaClO_2$, 40% sol. | 64 | 36 | 59 | 41 | 7 | 1.8 | .4 |
| 2% $NaClO_2$, 40% sol. | 72 | 28 | 70 | 30 | 14 | 2.0 | 0 |
| 1% $NaClO_2$, 40% sol. | 84 | 16 | 83 | 17 | 18 | 5.7 | 0 |

(b) Relationship between bleaching action and temperature conditions: 3% $NaClO_2$; time 1½ hours.

| State in which $NaClO_2$ was used | Composition of the sulfuric acid in the sulfonation product: Reaction with the bleach— | | | | Temperature, ° C. | Color Values | | |
|---|---|---|---|---|---|---|---|---|
| | Before | | After | | | | | |
| | Percent $SO_3$ | Percent $H_2O$ | Percent $SO_3$ | Percent $H_2O$ | | Yellow | Red | Blue |
| 40% sol | 34 | 36 | 59 | 41 | 30 | 6 | 1.4 | 0.8 |
| Solid | | | | | 30 | 4.7 | 0.9 | 0 |
| 40% sol | 34 | 36 | 59 | 41 | 40 | 3.5 | 0.9 | .1 |
| Solid | | | | | 40 | 4.6 | 1.0 | 0 |
| 40% sol | 34 | 36 | 59 | 41 | 50 | 5.6 | 1.5 | .2 |
| Solid | | | | | 50 | 17 | 3.7 | 0 |
| 40% sol | 34 | 36 | 59 | 41 | 60 | 6.0 | 1.1 | 0 |
| Solid | | | | | 60 | 6.0 | 1.4 | .1 |
| 40% sol | 34 | 36 | 59 | 41 | 70 | 5.0 | 1.0 | .1 |
| Solid | | | | | 70 | 15 | 4.2 | .7 |
| 40% sol | 34 | 36 | 59 | 41 | 80 | 9.0 | 2.0 | .6 |
| Solid | | | | | 80 | 27.0 | 9.0 | 2.6 |

(c) Relationship between bleaching action and time.
(c=1) 3 wt. percent $NaClO_2$ solid; bleaching temperature 40° C.

| | Color values | | |
|---|---|---|---|
| | Yellow | Red | Blue |
| Bleaching Time: | | | |
| ½ hour | 9 | 1.1 | 0 |
| 1 hour | 6.3 | 1.0 | 0 |
| 2 hours | 4.9 | 0.8 | 0 |
| 4 hours | 6.0 | 1.1 | 0 |

(c=2) 3 wt. percent $NaClO_2$ in 40% aqueous solution, 40° C.

| | Composition of the sulfuric acid in the sulfonation product: Reaction with the bleach | | | | | | |
|---|---|---|---|---|---|---|---|
| | Before | | After | | Color Values | | |
| | Percent SO₃ | Percent H₂O | Percent SO₃ | Percent H₂O | Yellow | Red | Blue |
| Bleaching Time: | | | | | | | |
| ½ hour | 64 | 36 | 59 | 41 | 7 | 1.2 | 0 |
| 1 hour | 64 | 36 | 59 | 41 | 3 | 1.1 | 1.0 |
| 2 hours | 64 | 36 | 59 | 41 | 7 | 1.2 | 0 |
| 4 hours | 64 | 36 | 59 | 41 | 10 | 2.0 | 0 |

(d) Influence of quantity of water on bleaching action. 3 percent NaClO₂ in the form of an aqueous solution or suspension. Temperature 40° C.; bleaching time 90 minutes.

| | Composition of the sulfuric acid in the sulfonation product: Reaction with the bleach | | | | | | |
|---|---|---|---|---|---|---|---|
| | Before | | After | | Color Values | | |
| Concentration of the suspension or solution | Percent SO₃ | Percent H₂O | Percent SO₃ | Percent H₂O | Yellow | Red | Blue |
| 80% NaClO₂, susp | 91 | 9 | 89 | 11 | 2.0 | 0.2 | 0.1 |
| 60% NaClO₂, susp | 80 | 20 | 77 | 23 | 2.2 | 0.2 | 0 |
| 50% NaClO₂, susp | 72 | 28 | 68 | 32 | 4.2 | 0.8 | 0 |
| 40% NaClO₂, sol | 64 | 36 | 59 | 41 | 3.5 | 0.9 | .1 |
| 30% NaClO₂, sol | 53 | 47 | 48 | 52 | 7.0 | 1.3 | 0 |
| 20% NaClO₂, sol | 40 | 60 | 35 | 65 | 6.0 | 1.0 | 0 |
| 10% NaClO₂, sol | 22 | 78 | 19 | 81 | 6.0 | 1.0 | 0 |

EXAMPLE 9

Into a hydrogenated palm nut fatty acid ethyl ester (iodine number 0.4) so much gaseous sulfur trioxide, diluted with 20 times its quantity with air, is introduced at 80° C. in the course of one hour that 1.3 mols of sulfur trioxide are absorbed per mol of fatty acid radical. Then the reaction product is kept at 80° C. for an additional 15 minutes, and then cooled to room temperature. The sulfonation of the product amounts to 95.5%; the sulfur trioxide content is approximately 7.8% by weight.

The oxidants listed below are stirred into the crude sulfonation product in the form of 40% aqueous solutions or suspensions, in an amount equal to 3% by weight. The mixture is then heated to 60° C. and held at this temperature for one hour. Then it is neutralized with 10% caustic soda solution.

| | Composition of the sulfuric acid in the sulfonation product: Reaction with the bleach | | | | | | |
|---|---|---|---|---|---|---|---|
| | Before | | After | | Color Values | | |
| | Percent SO₃ | Percent H₂O | Percent SO₃ | Percent H₂O | Yellow | Red | Blue |
| Bleach: | | | | | | | |
| NaBO₂·H₂O₂ | 64 | 36 | 60 | 40 | 2.5 | 0.6 | 0 |
| Na₂O₂ | 64 | 36 | 52 | 48 | 13 | 2.7 | 0 |

EXAMPLE 10

Hydrogenated palm nut fatty acid ethyl ester (iodine number 0.4) is sulfonated in a manner similar to that of Example 9; the sulfur trioxide pumping time is 65 minutes; then the reaction product is kept for another 15 minutes at 80° C. Due to the somewhat longer reaction time in comparison to the procedure described in Example 9, the sulfonation degree is somewhat higher, amounting to 96.6%; the free sulfur trioxide content corresponds approximately to that of the product of Example 9.

The product thus obtained is kept for one hour at 55 to 60° C. after the addition of 2.5% of its weight in H₂O₂. Then the sulfonic acid and the excess sulfonating agent are neutralized with 10% caustic soda solution. At the time of neutralization, only 70% of the hydrogen peroxide has been consumed; the neutralized sulfonation product is allowed to stand, its temperature then falling to room temperature. The hydrogen peroxide which has not been consumed up to the time of neutralization continues to work. The following color values are measured at the time of neutralization and 24 hours after neutralization: yellow 9 and 4, red 1.6 and 0.4, and blue 0 and 0, respectively.

It will be appreciated that the present invention represents an improvement over the various inventions claimed in co-pending U.S. applications, Ser. No. 194,838, now abandoned; Ser. No. 194,839, now U.S. Patent No. 3,251,868; Ser. No. 194,840, now U.S. Patent No. 3,256,303; Ser. No. 194,786, now U.S. Patent No. 3,158,632; Ser. No. 194,998, now U.S. Patent No. 3,159,657, of which the instant application is a continuation-in-part; Ser. No. 194,965, now U.S. Patent No. 3,142,691; and Ser. No. 194,997, now abandoned. While the co-pending applications corresponding to the first four mentioned Ser. Nos. relate to the sulfonation of fatty acids, esters, etc., the co-pending applications corresponding to the latter three mentioned Ser. Nos. are concerned with particular bleaching methods applicable to the lightening of the color of the sulfonated reaction mixtures obtained in accordance with the methods of said co-pending applications corresponding to the first four mentioned Ser. Nos. The instant case represents a combination of steps permitting the simple, versatile, and rapid production of light colored surface active sulfo fatty acid esters within extremely short periods of time including the time necessary for the α-sulfonation of saturated fatty acid esters free from alcohol hydroxyl groups and the consequent bleaching, so long as an excess of gaseous sulfur trioxide is used as a sulfonating agent and just sufficient water is present, apart from the actual bleaching substance, to provide with the excess sulfur trioxide a theoretical mixture of SO₃ and H₂O whose SO₃-content is between 90% by weight and that of an aqueous sulfuric acid of 20% by weight H₂SO₄. Indeed, by attaining during the α-sulfonation a degree of sulfonation of at least 90%, under the specified conditions, the reaction product obtained may be bleached advantageously within a very short period of time, considering the temperatures utilized, and the optional neutralization step of the reaction mixture prior to the completion of the bleaching. The foregoing is possible without the need for a solvent during the sulfonation and with the convenient utilization of the excess sulfonating agent to attain the decisive theoretical sulfuric acid concentration during the bleaching noted above.

What is claimed is:

1. In the process for the production of light colored surface active sulfo-fatty acid esters, the improvement which comprises α-sulfonating fatty acid esters having a saturated fatty acid radical with 6–28 carbon atoms and an ester radical with 1–5 carbon atoms and being free of alcoholic hydroxyl groups, by contacting with a stoichiometric excess of gaseous sulfur trioxide, in the absence of solvents, at a temperature maintained between 20–100° C. and for at least a part of the sulfonation at between 70–100° C., until a sulfonation degree of at least 90% is attained, and bleaching the crude sulfonation product thereby obtained by contact with an aqueous bleaching component selected from the group consisting of hypochlorous acid, chlorine, sodium hypochlorite, potassium hypochlorite, magnesium hypochlorite, calcium hypochlorite, chlorous acid, chlorine dioxide, sodium chlorite, potassium chlorite, magnesium chlorite, calcium chlorite, hydrogen peroxide, alkali peroxide, alkaline earth peroxide, perborate, percarbonate, perphosphate, urea addition product with hydrogen peroxide, and hexamethylene tetramine addition product with hydrogen peroxide, at a temperature up to a maximum of 100° C., said aqueous component providing sufficient water to the reaction mixture to maintain with the excess sulfur trioxide present a theoretical mixture of $SO_3$ and $H_2O$ whose $SO_3$-content is between 90% by weight and that of an aqueous sulfuric acid of 20% by weight $H_2SO_4$.

2. Improvement according to claim 1 wherein the sulfur trioxide is diluted with an inert gas and the sulfur trioxide excess used amounts to between 0.05–1 mol per fatty acid radical, the sulfonation being carried out for a period of from 20 minutes to 2 hours at a temperature of between 20–100° C.

3. Improvement according to claim 2 wherein the aqueous bleaching component is used in an amount sufficient to provide an equivalent quantity of bleaching oxygen to that of between 0.2–6% by weight hydrogen peroxide, calculated as 100% by weight $H_2O_2$.

4. Improvement according to claim 3 wherein a mixture of water with hydrogen peroxide in a concentration of 1–100% by weight $H_2O_2$ is used as aqueous component, and the bleaching is carried out at a temperature of between 20–80° C.

5. Improvement according to claim 3 wherein a mixture of water with a member selected from the group consisting of alkali peroxide, alkaline earth peroxide, perborate, percarbonate, perphosphate, urea addition product with hydrogen peroxide and hexamethylene tetramine addition product with hydrogen peroxide, is used as aqueous component, and the bleaching is carried out at a temperature of between 20–80° C.

6. Improvement according to claim 3 wherein a mixture of water with a member selected from the group consisting of hypochlorous acid, chlorine, sodium hypochlorite, potassium hypochlorite, magnesium hypochlorite and calcium hypochlorite, is used as aqueous component, and the bleaching is carried out at a temperature of between 10–50° C.

7. Improvement according to claim 3 wherein a mixture of water with a member selected from the group consisting of chlorous acid, chlorine dioxide, sodium chlorite, potassium chlorite, magnesium chlorite and calcium chlorite, is used as aqueous component, and the bleaching is carried out at a temperature of between 40–100° C.

8. Improvement according to claim 3 wherein the bleaching is interrupted prior to completion of the color lightening of the crude sulfonation product, the reaction mixture is extensively neutralized, and the bleaching continued until the color of the reaction mixture has been further lightened.

9. Improvement according to claim 8 wherein the neutralization is carried out to the extent that at least 75% of the sulfonic acids present are neutralized.

10. Improvement according to claim 9 wherein neutralization is carried out to the extent that the reaction mixture is rendered alkaline.

11. Improvement according to claim 8 wherein the post-neutralization bleaching is carried out for a period of 10 minutes to 1 hour.

12. Improvement according to claim 1 wherein the fatty acid ester is an ester of a saturated fatty acid with a lower alcohol.

13. Improvement according to claim 1 wherein said fatty acid ester is a purified fatty acid ester material having an iodine number below about 2.

References Cited

UNITED STATES PATENTS

| | | | |
|---|---|---|---|
| 2,804,466 | 8/1957 | Schurman | 260—400 |
| 3,159,657 | 12/1964 | Wulff et al. | 260—400 |
| 3,169,142 | 2/1965 | Knaggs et al. | 260—401 X |

ALEX MAZEL, Primary Examiner

JAMES H. TURNIPSEED, Assistant Examiner